(12) United States Patent  (10) Patent No.: US 7,084,357 B2
Roberts et al.  (45) Date of Patent: Aug. 1, 2006

(54) LUGGAGE DEVICE WITH BUILT-IN LOAD DETERMINATION

(76) Inventors: Howard Roberts, 73 Sky Manor Rd., Pittstown, NJ (US) 08867; George J. Nagle, 625 Strykers Rd., Phillipsburg, NJ (US) 08865; Steven A. Nagle, 2995 Hemlock Farms, Lords Valley, PA (US) 18428

( * ) Notice: Subject to any disclaimer, the term of this patent is extended or adjusted under 35 U.S.C. 154(b) by 113 days.

(21) Appl. No.: 10/816,347

(22) Filed: Apr. 1, 2004

(65) Prior Publication Data

US 2005/0217903 A1  Oct. 6, 2005

(51) Int. Cl.
*G01G 19/52* (2006.01)
*G01G 19/58* (2006.01)

(52) U.S. Cl. .................. 177/131; 177/148; 177/245; 190/100

(58) Field of Classification Search ............... 177/131, 177/245, 148–149; 190/100
See application file for complete search history.

(56) References Cited

U.S. PATENT DOCUMENTS

| | | | | |
|---|---|---|---|---|
| 1,197,190 A | | 9/1916 | Dunn et al. ............... 280/47.35 |
| 2,518,973 A | * | 8/1950 | Atherton ..................... 190/102 |
| 2,710,083 A | * | 6/1955 | White ......................... 190/102 |
| 2,759,577 A | * | 8/1956 | White ......................... 190/102 |
| 2,937,016 A | * | 5/1960 | Westman ..................... 177/131 |
| 3,090,454 A | * | 5/1963 | Farrar et al. ................. 177/131 |
| 4,800,973 A | * | 1/1989 | Angel ......................... 177/211 |
| 4,913,248 A | * | 4/1990 | Zakai ........................ 177/210 C |
| 5,031,710 A | * | 7/1991 | Parker et al. ........... 177/210 FP |
| 5,222,399 A | * | 6/1993 | Kropp ....................... 73/862.68 |
| 5,355,980 A | | 10/1994 | Hsieh ......................... 190/115 |
| 5,560,458 A | | 10/1996 | Franklin et al. ............. 190/115 |
| 5,714,695 A | * | 2/1998 | Bruns ..................... 73/862.641 |
| 5,816,374 A | | 10/1998 | Hsien ......................... 190/115 |
| 6,032,771 A | | 3/2000 | Pedrini ...................... 190/18 A |
| 2005/0051586 A1 | * | 3/2005 | Siwak et al. |

FOREIGN PATENT DOCUMENTS

WO  WO 3100360 A1 * 12/2003

* cited by examiner

*Primary Examiner*—Randy W. Gibson
(74) *Attorney, Agent, or Firm*—Charles A. Wilkinson; Clinton H. Wilkinson

(57) ABSTRACT

A luggage device includes: (a) a main housing, the main housing having a top, a bottom, and walls, and having an opening area for insertion of one or more items into the main housing, with closure means; (b) load determination component connected to the main housing at the bottom, having at least one base member with a first position where it is not in contact with and resting on a separate surface under weight of the luggage device, and having a second position where it is in contact with and resting on a separate surface under weight of the luggage device, and is capable of weight determination; (c) load determination display mechanism connected to the load determination component for display of weight determined. In yet other embodiments, the present invention luggage device is arranged so that the handle rather than the bottom is utilized to function as part of the weighing capability.

26 Claims, 5 Drawing Sheets

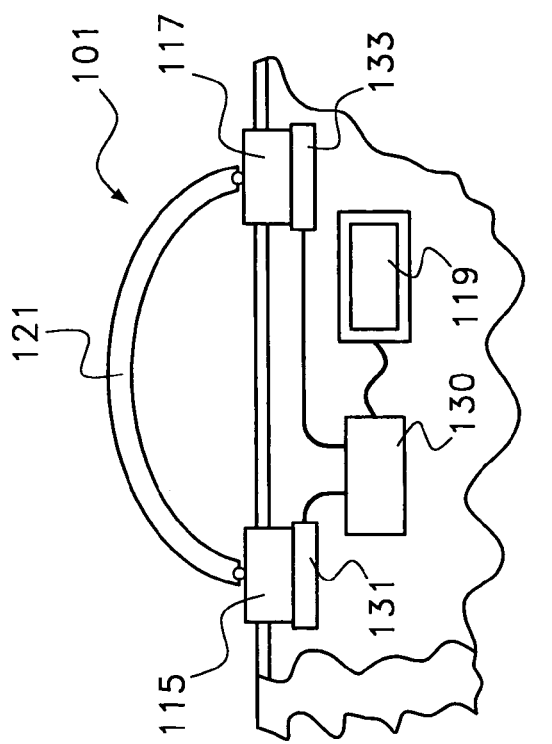
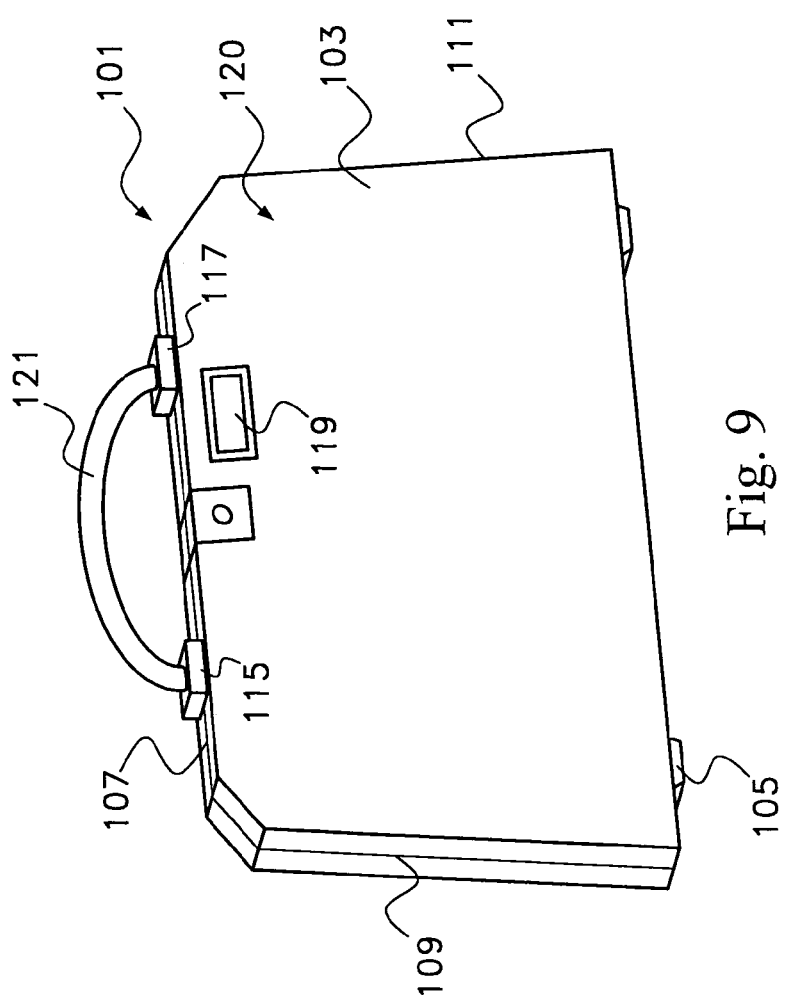

LUGGAGE DEVICE WITH BUILT-IN LOAD DETERMINATION

BACKGROUND OF THE INVENTION

1. Field of the Invention

The present invention relates to luggage devices, such as suitcases, hatboxes, briefcases, laptop and other computer bags, and the like. More particularly, it relates to such luggage devices that include built-in load determination capabilities. Thus, the present invention devices include built-in weighing mechanisms and weight display mechanisms, for gross weight, or net weight (contents), or both. The displays may be openly viewable or only available upon entry of a code or unlock feature.

2. Description of Related Art

The following prior art is representative of the state of the art in the field of luggage:

U.S. Pat. No. 6,032,771 describes an article of luggage which comprises a main body provided with an upper handle for gripping and carrying the article of luggage, and with lower wheels. It is further provided with an extendable towing member, for towing the article of luggage on the wheels, this member being slidably mounted between a retracted inoperative position and an extended operative position. The whole body of the main handle forms part of said extendable towing member, so that the whole main handle acts also as towing handle of the article of luggage when the towing member is in its extended position.

U.S. Pat. No. 5,816,374 describes a lock mechanism of a pull handle assembly for locking a pull handle of the pull handle assembly. The pull handle assembly of a wheeled suitcase comprises a head set mounted on an upper end of the suitcase, two elongated tubes vertically mounted under the head set, a U-shaped pull handle having a gripping handle and two rod members telescopingly mounted within the two tubes, each of the two rod members comprising a hole installed near the gripping handle, and a lock mechanism installed in the head set comprising two locking members installed between the two rod members for latching the two holes of the rod members and a rotatable switch for releasing the two locking members from the two holes of the rod members, the rotatable switch comprising a chip rotatably fixed between the two locking members, said chip comprising two holes and one chip handle, each of the two locking members comprising a button slidingly engaged in one of the two holes of the chip wherein the two buttons of the two locking members are moved by the two holes of the chip when the chip is rotated by pulling the chip handle.

U.S. Pat. No. 5,560,458 describes a handle and restraint assembly which is for maneuvering a main luggage case having wheels. An extendable handle is moveable into a fully extended position, a fully retracted position, and a selected intermediate position. A restraint device is operatively connected to the handle to selectively restrain the handle in the extended and retraced positions. The restraint device includes a selectively extendable elongated flexible belt by which to connect an auxiliary luggage case for carrying on the main case. The elongated flexible element is extendable for connection to the handle, and may restrain the handle in an intermediate position for carrying the case or for pulling the case on the wheels. A first clutch controls the extension, retraction and retention of the belt, and a second clutch controls the extension, retraction and retention of the handle. The first and second clutches are separately operable independently or they are interconnected to operate simultaneously.

U.S. Pat. No. 5,255,980 describes a suitcase which includes a hollow suitcase body which has a front side wall, a rear side wall that is formed with a longitudinally extending recess, and a wheel unit that is mounted on a lower end portion of the rear side wall. A foldable plate is mounted pivotally on the front side wall and is turnable outward to a carrying position in which the foldable plate is generally perpendicular to the front side wall. A cover plate is mounted on the rear side wall to cover the recess. A strap mounting frame is mounted on an inner face of the cover plate and has a top portion provided with horizontally extending first hook support, a rotatable shaft, and a strap wound on the shaft and having one end fixed thereto. A handle member has two upright tubular portions which are inserted slidably into two upright tubular sleeves formed on the inner face of the cover plate. The handle member further has a horizontal second hook support extending across distal top ends of the tubular portions. A strap has a distal end which is provided with a hook unit that engages removably the first hook support when the strap is wound fully on the rotatable shaft. The hook unit engages removably the second hook support after the strap is pulled to bind an object carried on the foldable plate.

U.S. Pat. No. 1,197,190 describes a baggage carrier comprising a body, wheels thereon, a baggage securing member on the body, and an extensible handle on the securing member.

The art of weighing scales is very old, and spring scales have been used for centuries. More recently, the prior art includes strain gauges and load cells, and these are commercially available, and the working details are well within the purview of the artisan.

Notwithstanding the prior art, the present invention is neither taught nor rendered obvious thereby.

SUMMARY OF THE INVENTION

The present invention relates to a luggage device, for carrying clothing, documents, computers or other items, that has a load determination capability. This device includes:

(a) a main housing, the main housing having a top, a bottom, and walls, and having an opening area for insertion of one or more items into the main housing, the opening area including closure means;

(b) load determination means connected to the main housing at the bottom, the load determination means having at least one base member at the bottom, the base member having a first position where it is not in contact with and resting on a separate surface under weight of the luggage device, and having a second position where it is in contact with and resting on a separate surface under weight of the luggage device, such that when the base member of the load determination means is in the second position, the load determination means is capable of determining the weight of the luggage device and/or any contents therein;

(c) load determination display means connected to the load determination means for display of weight determined by the load determination means.

The present invention luggage device load determination means may be any known weighing mechanism, including, but not limited to a mechanical scale means, a strain gauge means, a load cell means, or combinations thereof. While the foregoing is stated in the singular, this should be construed to include one or more than one such load determination means in the present invention luggage device.

In one preferred embodiment, the luggage device is engineered such that the bottom of the main housing has a plurality of bottom pods, i.e., feet, rests, wheels or other stand-on protrusions, and there are a plurality of the base members of the load determination means, and at least one base member is connected to each of the plurality of bottom pods. For example, in one preferred arrangement consistent with many luggage items, the main housing has a generally rectangular bottom with four corners, and there are four bottom pods connected to the bottom, one of each of the four pods being located proximate each of the four corners, and there are a plurality of the base members of the load determination means and at least one base member is connected to each of the four bottom pods.

When plural load determination means are utilized, each such means will send its weight data to the processor, in all instances including where there is significant uneven weight distribution, and total weight will accurately be determined.

In many preferred embodiments of the present invention, the luggage device load determination means includes at least one control chip and a portable power source to power the chip, the chip having sufficient capability to receive, store optionally transmit, and display weight data from a load determination component and to the load determination display means.

In some preferred embodiments, the main housing includes user input means connected to the chip, and the chip is programmable to set a start weight storage data, to obtain new weight data periodically, and to compare the start weight storage data to the new weight storage data, and to display comparative information on the load determination display means. The main housing may preferably include user input means connected to the chip, and the chip may be programmable to set a start weight storage data, to obtain new weight data when the user input means signals to do so, to compare the start weight storage data to new weight storage data, and to display comparative information on the load determination display means. The main housing may include user input means connected to the chip, along with an alarm connected to the chip, and the chip may be programmable as described above, i.e., to set a start weight storage data, to obtain new weight data periodically, and to compare the start weight storage data to the new weight storage data, and to set off the alarm if the comparison exceeds a predetermined amount of weight difference.

The portable power source could be one or more rechargeable or disposable batteries, power cells or any equivalent powering mechanism.

In yet other embodiments, the present invention luggage device is arranged so that the handle rather than the bottom is utilized to function as part of the weighing capability. (Alternatively, both the handle and the bottom or bottom pods could be used together. For example, the handle would show net weight (contents) when the luggage is picked up, and total weight or gross weight when the luggage is put down.) In any event, the handle-based embodiments include:

a main housing, the main housing having a top, a bottom, and walls, and having an opening area for insertion of one or more items into the main housing, the opening area including closure means; a handle located at the top of the main housing; load determination means connected to the handle and to the main housing at the top, the load determination means having at least one base member, the base member having a first position where the main housing it is not picked up and suspended by the handle, and having a second position where the main housing is picked up and suspended by the handle with the base member being under weight of the luggage device, such that when the base member of the load determination means is in the second position, the load determination means is capable of determining the weight of the luggage device and any contents therein; and, a load determination display means connected to the load determination means for display of weight determined by the load determination means.

The load determination means and all of the other features described above with respect to the bottom-based devices could be included, with similar preferences, in the handle-based present invention luggage devices.

In some embodiments, one or more wireless connections could be used in place of connecting wires to provide wireless internal connection.

In other embodiments, a transmitter could be included to send an alarm or other signal(s) to a user via a separate receiver device at even a programmed cell phone number. Wireless could be radio, IR, or equivalent, and could include RFID (radio frequency identification devices).

BRIEF DESCRIPTION OF THE DRAWINGS

The present invention should be more fully understood when the specification herein is taken in conjunction with the drawings appended hereto wherein:

FIG. 9 shows an oblique view of another present invention luggage device;

FIG. 10 shows the FIG. 9 present invention device in a partial cut front open view of the handle and weighing mechanism.

DETAILED DESCRIPTION OF THE PRESENT INVENTION

The present invention luggage device enables a user, a pilot or airline employee, a boater, a bus employee, a home-land security officer, or other person to instantly determine the weight of an item of luggage. This information may be available by either setting the luggage device down, as in embodiments wherein the load determining feature is in the base or bottom, or by picking up the luggage device, as in embodiments wherein the load determining feature is connected to a handle.

The present invention luggage device enables airline patrons to determine whether or not their luggage exceeds the limits for a particular travel plan, airline personnel to confirm luggage weight, and small craft operators who may not have scales immediately available, to immediately determine load factors and enable weight and balance determinations.

The present invention luggage device also enables an owner to check weight before leaving home and to recheck weight at any time thereafter. For example, if luggage leaves an owner's side, as for loading or unloading, hotel check in or check out, or otherwise, an increase in weight could instantly signal that drugs or a bomb or stolen goods have been hidden in that luggage. Likewise, a weight decrease could mean that a jewelry box, valuable equipment, laptop computer, camera, etc. was just stolen. Such quick response time afforded by the present invention could therefore pinpoint a crime, help catch a thief or even prevent a disaster or terrorist attack.

Figure 1:
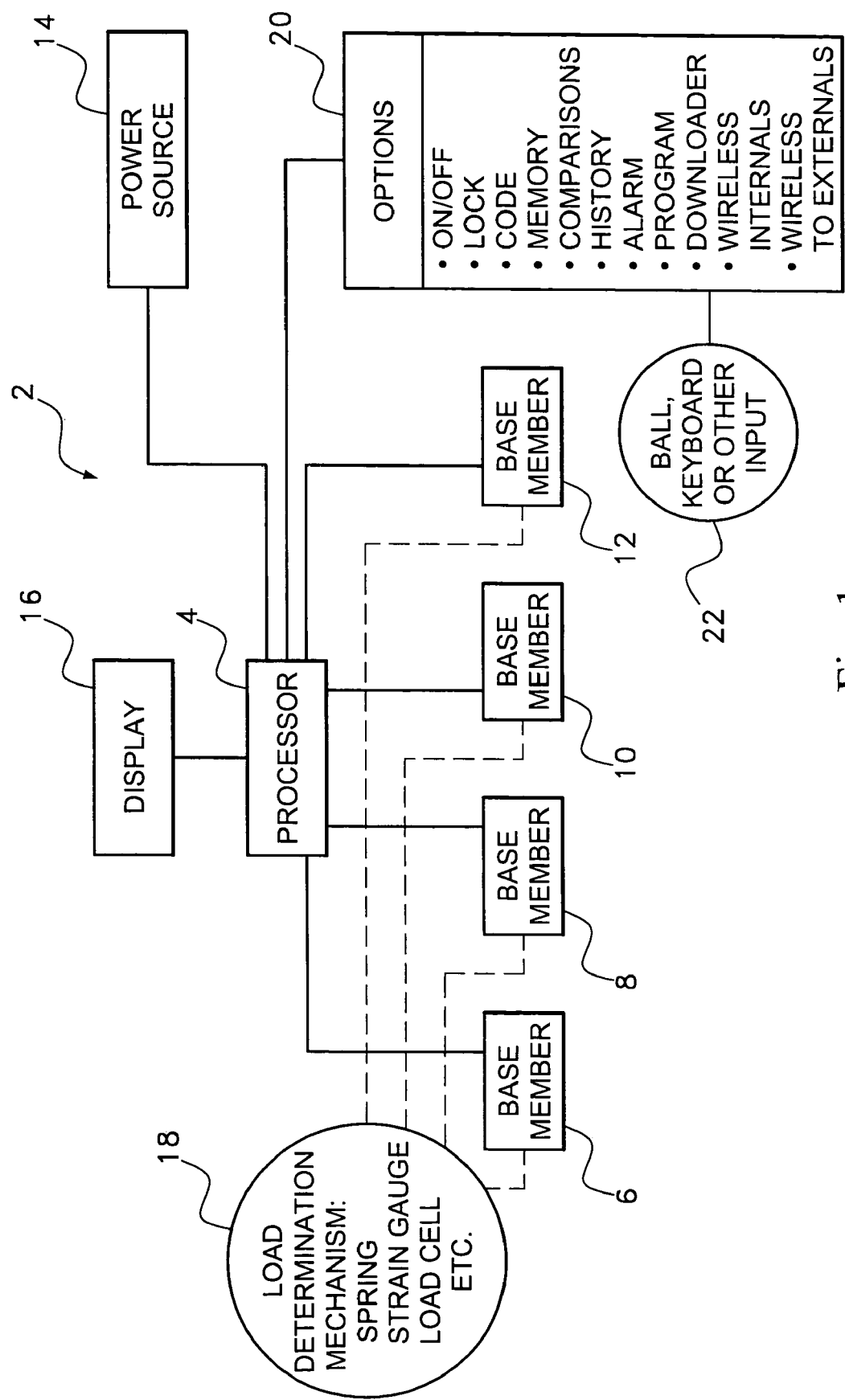
FIG. 1 illustrates a schematic diagram of one type of present invention luggage device.

Referring now in detail to the drawings,

FIG. 1 illustrates a schematic diagram of one type of present invention luggage device 2. The device 2 includes a processor 4 in a main housing (discussed below), that is integrally connected to one or more load determination mechanisms contained in one or more base members, namely, here, base members 6, 8, 10, and 12. These base members could extend downwardly from a suitcase, briefcase, computer case with a hard bottom, or similar luggage, and be connected to pods (feet, rests, wheels, or other luggage and case base elements), that rest on the floor when such luggage is set down. They include or are directly connected to load determination mechanisms 18, which feed back to processor 4.

The processor 4 includes sufficient capabilities to receive, store, optionally transmit, and, cause the display of weight, either as total weight or net content weight, or both. The processor is powered by power source 14, and is connected to display 16. Display 16 could be a mechanical display, an analog display or a digital display. However, it is preferably a screen display, such as LCD or plasma screen display, or any other available display.

The processor 4 is also optionally connected to options 20. These include on/off switch, lock, code memory, comparisons, history, alarm, programming features, a downloading capability, such as a port or wireless transmission, or both. The on/off switch is preferred, but the device could be set up to automatically operate for a limited time period, e.g., one minute, and then shut off each time after it is activated (set down). The lock could be mechanical or digital and could require unique entry identifiers, such as a series of inputted characters, a fingerprint, voice recognition or similar security mechanism. The codes could be to access different types of information in memory or to set an alarm or input a weight limit. The memory could store one or more types of information, such as absolute weights, tare weight, dates of weights, limits, history, etc. The processor 4 could receive, store, compare, subtract, add, and otherwise usefully process the data. The processor 4 could include programming to make adjustments, or to change some features. These might be English to metric weight, history storage time range, code or combination lock changes, or some other feature change. Input means 22 might be a keypad, touchpad or keyboard, a ball, a voice recognition/voice activated/voice operated input system or otherwise. The input means could be used for start/reset/alarm limit or other input or programming purposes.

Figure 2:
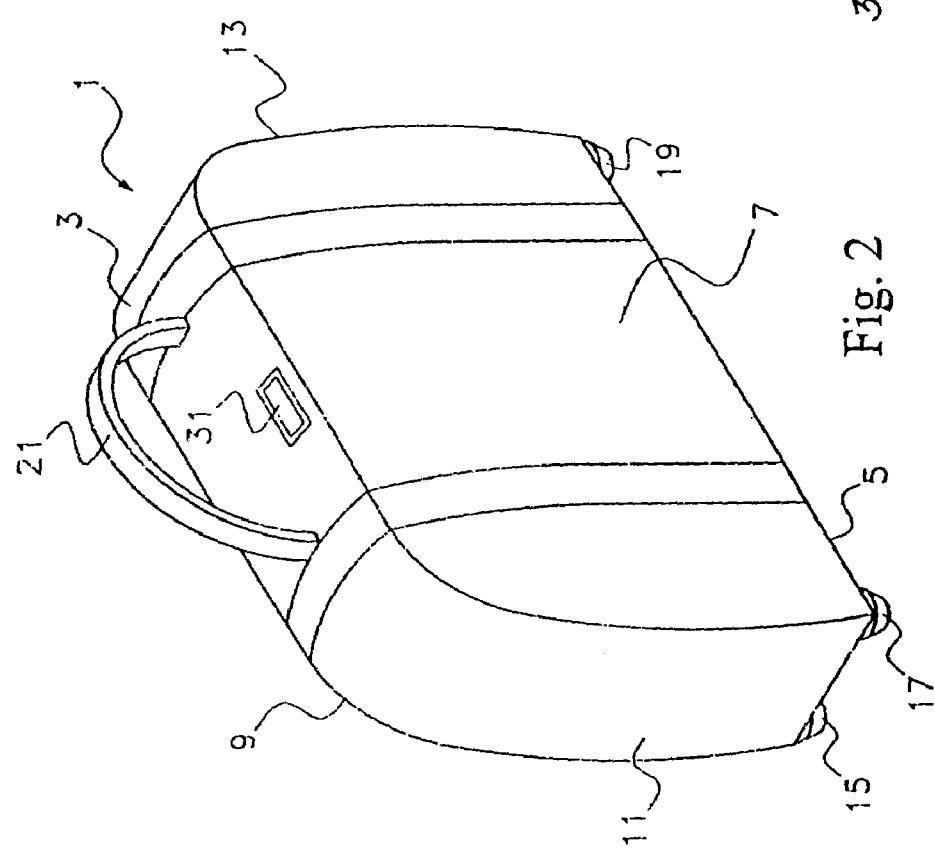
FIG. 2 shows an oblique view of the present invention luggage device.
Figure 5:
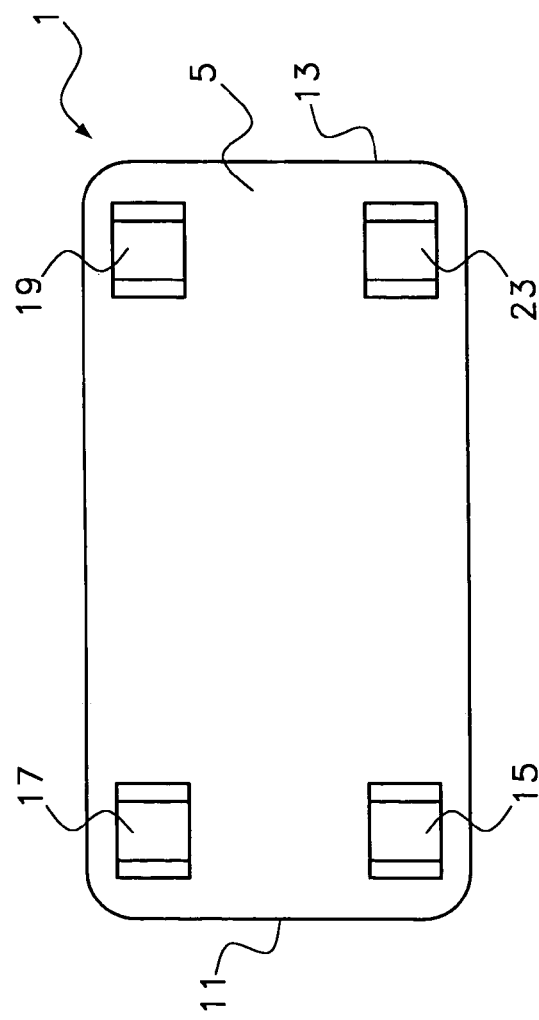
FIG. 5 shows a bottom view of the present invention device shown in FIGS. 2, 3, and 4.

FIG. 2 shows an oblique view of a present invention luggage device 1. Luggage device 1 includes a top 3, a bottom 5, a front 7, a back 9, a left side 11, and a right side 13, as well as a handle 21. Device 1 could be round, oval irregular, square, or any other shape, and sides, front, back, top and bottom as used herein are used for orientation rather than structural limitations. There are four rests or pods on bottom 5, and pods 15, 17 and 19 are shown, with pod 23 hidden, but shown in FIG. 5. Both FIG. 1 and FIG. 5 are taken collectively, and identical parts are identically numbered. Each of the pods 15, 17, 19, and 23 is directly connected to a base member, such as a rod or bar or other mechanical support structure that is affixed to a load determining mechanism, such as a spring scale, a strain gauge, a load cell, or any other weighing means, that will activate and will give true weight or a true weight component for multiple pods, as here, when the device 1 is set down in a normal (upright) position on a flat surface such as a floor. Thus, there is a first position wherein the base members are not in contact with a supporting surface (via the pods), and a true weight or even a weight cannot be ascertained, and there is a second position wherein the device is resting on a floor and there is a weight force on the luggage device and its contents that will allow the load determining means to give true weight data to a display, e.g., mechanically, or preferably via a processor (discussed above and below).

Figure 3:
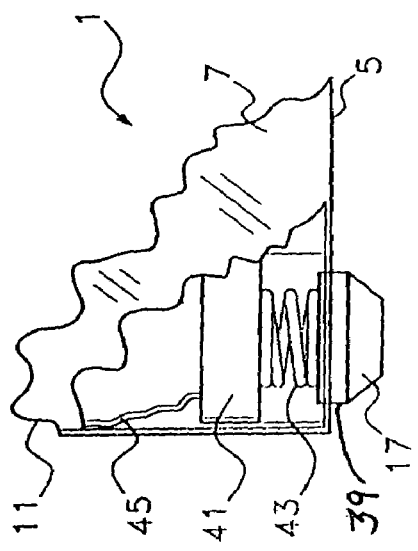
FIG. 3 shows the FIG. 2 device in a partial cut front open view of the pod and one choice of weighing mechanism (mechanical) with no weight (in the air)
Figure 4:
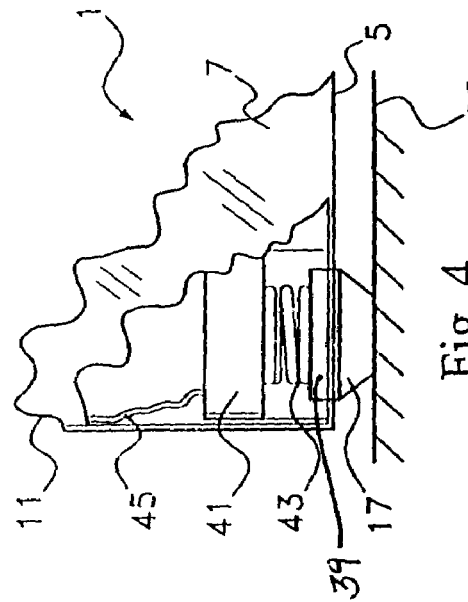
FIG. 4 illustrates the same view but with pod on a floor, under force and in a weighing position.

FIG. 3 shows the FIG. 2 device 1 in a partial cut front open view of the pod 17 with identical parts identically numbered. It includes a weighing mechanism, i.e., spring scale load determination means 43 and processor component 41. Processor component 41 is wired via wire 45 to other components connected to their base members 39, and one of these processor components collects, stores and adds the values, and effects a display thereof at display 31 (FIG. 1). (Some or all components could alternatively be connected wirelessly.) However, in FIG. 3, with the luggage device 1 in the air there is no weight indicated. In FIG. 4 the same view is illustrated but with pod 17 on floor 25, under force, compressing spring scale load determination means 43 and, thus, in a weighing position.

Figure 6:
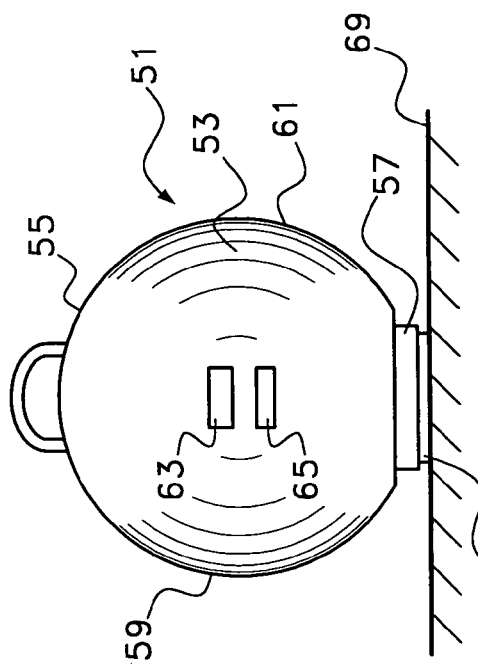
FIG. 6 shows a front view and FIG. 7 shows a bottom view of another present invention embodiment.
Figure 7:
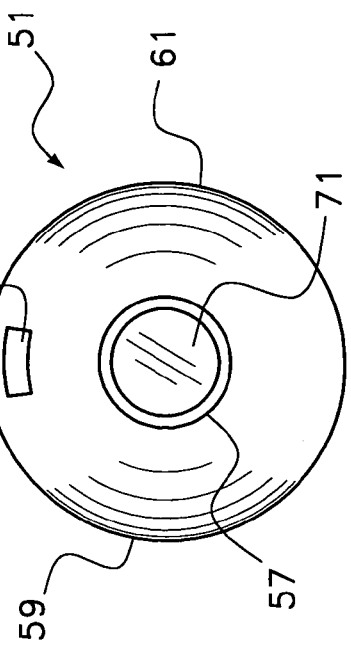

FIG. 6 shows a front view and FIG. 7 shows a bottom view of another present invention embodiment luggage device 51. Both FIGS. are taken together. This carrier has a globular shape, and has a front 53, a top 55, a bottom 57, a left side 59, and a right side 61, as well as a name tag 63. Bottom 57 is round and rests on a single round base plate 71. It is connected to a load cell that determines weight when the device 51 is set down on a flat surface, such as surface 69 of FIG. 6. The internal mechanism is not shown in detail, as load cells are well known and may be connected to the base plate (pod) 71 so as display gross or net weight via display screen 63. An internal processor, similar to those previously described herein is contained within the luggage (main housing) and performs any or all of the heretofore described functions.

Figure 8:
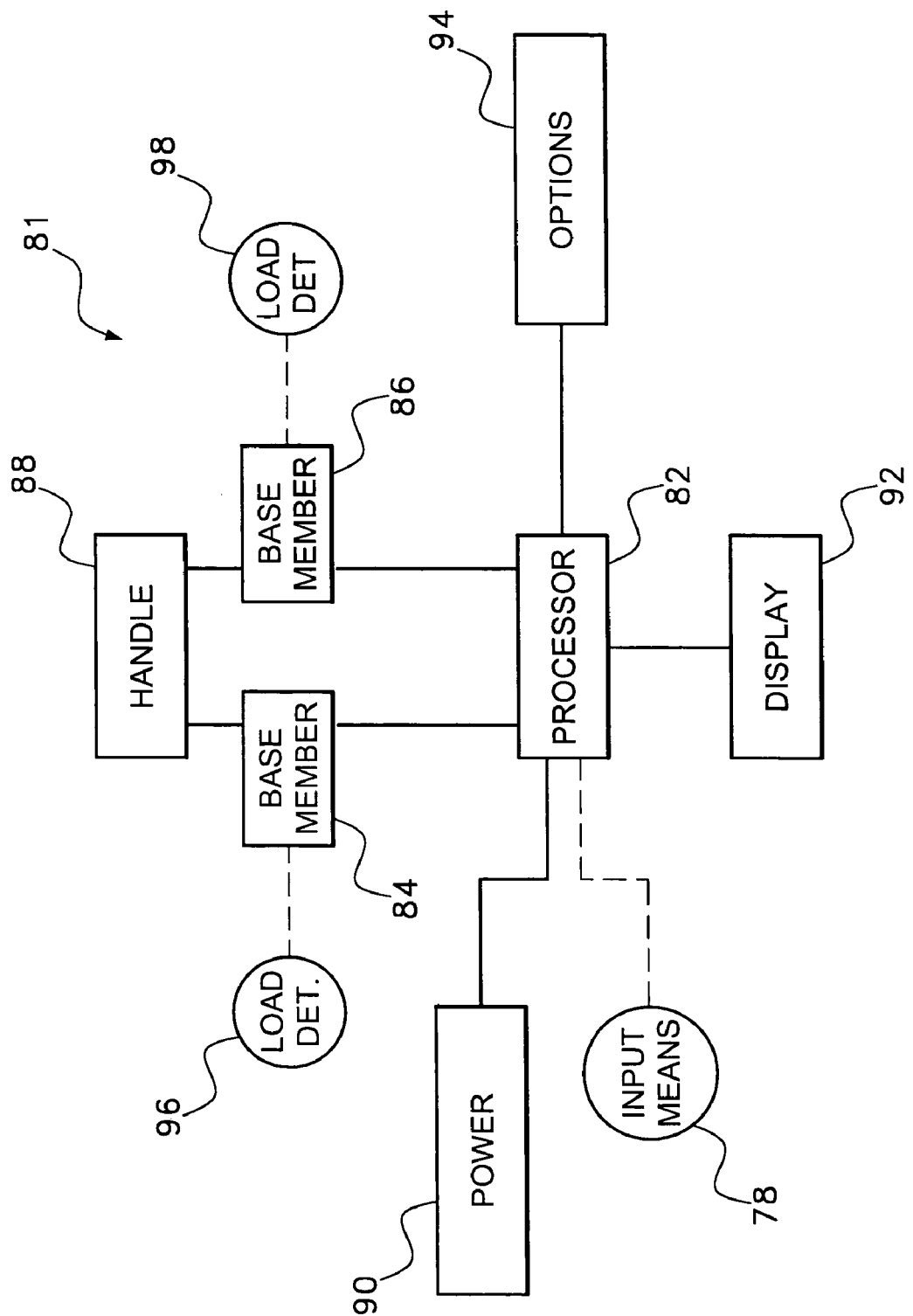
FIG. 8 illustrates a schematic diagram of another type of present invention luggage device.

FIG. 8 illustrates a schematic diagram of another type of present invention luggage device 81. The device 81 includes a processor 82 in a main housing (discussed below), that is connected to one or more load determination mechanisms contained in one or more base members, namely, here, two base members 84, and 86. These base members 84 and 86 are each connected to handle 88 and could extend upwardly from a suitcase, valise, briefcase, computer case with a hard or soft bottom, or similar luggage. They include or are connected to load determinations means 96 and 98, 50 that when the luggage device is picked up off a resting surface, the system is capable of weighing the device.

The processor 82 includes sufficient capabilities to receive, store and cause the display of weight, either as total weight or net content weight, or both. The processor is powered by power source 90, and is connected to display 92. Display 92 could be a mechanical display, an analog display or a digital display. However, it is preferably a screen display, such as LCD or plasma or any other available display.

The processor 82 is also optionally connected to options 94. These may be any already described above regarding earlier FIGS., and include on/off switch, lock, code memory, comparisons, history, alarm, programming features, a downloading capability, such as a port or wireless transmission, or both. The processor 82 could receive, store, compare, subtract, add, and otherwise usefully process the data. The processor 82 could include programming to make adjustments, or to change some features, also as described above. Input means 78 might be a keypad, touchpad, or keyboard, a ball, a voice recognition/voice activated/voice operated input system or otherwise. The input means could be used for start/reset/alarm limit or other input or programming purposes.

FIG. 9 shows an oblique view of another present invention luggage device 101. Luggage device 101 includes a top 107, a bottom 105, a front 103, a back (not shown), a left side 109, and a right side 111, as well as a handle 121. Device 101, like device 1 above in the previous FIGS., could be round, oval irregular, square, or any other shape, and sides, front, back, top and bottom as used herein are used for orientation rather than structural limitations. Handle 121 is not connected to the main housing shown generally as housing 120, but is connected to base members 115 and 117, which contain load determination means (load cells) connected to a processor, which is also connected to a power source and to display screen 119. Thus, each of the base members are mechanical support structures that are affixed to or include a load determining mechanism, such as a spring scale, a strain gauge, a load cell, or any other weighing means, that will activate and will give true weight or a true weight component for multiple base members, as here, when the device 101 is picked up by the handle from a set down in position. Thus, there is a first position wherein the base members are not being used to support the luggage device, such as when the device has been set down on a floor, and there is a second position wherein the device is picked up off a floor and is being held by the handle, wherein there is a weight force on the luggage device and its contents that will allow the load determining means to give true weight data to a display, e.g., mechanically, or preferably via the processor shown in this embodiment. FIG. 10 shows a partial cut open front view of the handle and weighing mechanism with no weight (on the floor) of the present invention device 101 shown in FIG. 9. Identical parts are identically numbered. Base members 115 and 117 pull on load determination means 131 and 133 when the device is lifted by handle 121. This sends signals to microprocessor 130, which includes a power source and a microchip with any of the optional features described above. It is connected to display screen 119, which includes a touch key pad for user input, as well as display features for weight and other output.

Obviously, numerous modifications and variations of the present invention are possible in light of the above teachings. It is therefore understood that within the scope of the appended claims, the invention may be practiced otherwise than as specifically described herein.

What is claimed is:

1. A luggage device for carrying clothing, documents, computers or other items, and having load determination capability, which comprises:
   (a) a main housing, said main housing having a top, a bottom, and walls, and having an opening area for insertion of one or more items into said main housing, said opening area including closure means;
   (b) load determination means integrally connected to said main housing at said bottom, said load determination means having at least one base member at said bottom, said base member having a first position where it is not in contact with and resting on a separate surface under the weight of the luggage device, and having a second position where it is in contact with and resting on a separate surface under weight of the luggage device, such that when the base member is in said second position, the load determination means is capable of determining the weight of said luggage device and any contents therein; and
   (c) load determination display means connected to said load determination means for displaying the weight determined by said load determination means.

2. The luggage device of claim 1 wherein said load determination means is a mechanical scale means.

3. The luggage device of claim 1 wherein said load determination means is a strain gauge means.

4. The luggage device of claim 1 wherein said load determination means is a load cell means.

5. The luggage device of claim 1 wherein there are a plurality of said base members of said load determination means, and additionally comprising a plurality of bottom nods connected to said bottom, with at least one base member being connected to each of said plurality of bottom pods.

6. The luggage device of claim 1 wherein said main housing has a generally rectangular bottom with four corners, and there are four bottom pods connected to said bottom, one of each of said four pods being located proximate each of said four corners, and there are a plurality of said base members of said load determination means and at least one base member is connected to each of said four bottom pods.

7. The luggage device of claim 1 wherein said load determination means includes at least one control chip and a portable power source to power said chip, said chip having sufficient capability to receive, store and display weight data from a load determination component and to said load determination display means.

8. The luggage device of claim 7 wherein said main housing includes user input means connected to said control chip, and said chip is programmable to set a start weight storage data, to obtain new weight data periodically, and to compare said start weight storage data to said new weight storage data, and to display comparative information on said load determination display means.

9. The luggage device of claim 7 wherein said main housing includes user input means connected to said control chip, and said chip is programmable to set a start weight storage data, to obtain new weight data when said user input means signals to do so, to compare said start weight storage data to new weight storage data, and to send and display comparative information on said load determination display means.

10. The luggage device of claim 7 wherein said main housing includes user input means connected to said control chip, and includes an alarm connected to said chip, and said chip is programmable to set a start weight storage data, to obtain new weight data periodically, and to compare said start weight storage data to said new weight storage data, and to set off said alarm if said comparison exceeds a predetermined amount of weight difference.

11. A luggage device for carrying clothing, documents, computers or other items, and having load determination capability, which comprises:
   (a) a main housing, said main housing having a top, a bottom, and walls, and having an opening area for insertion of one or more items into said main housing, said opening area including closure means;

(b) a handle located at said top of said main housing;

(c) load determination means connected to said handle and to said main housing at said top, said load determination means having at least one base member, said base member having a first position where said main housing it is not picked up and suspended by said handle, and having a second position where said main housing is picked up and suspended by said handle with said base member being under the weight of said luggage device, such that when said base member of said load determination means is in said second position, said load determination means is capable of determining the weight of said luggage device and any contents therein;

(d) load determination display means connected to said load determination means for display of weight determined by said load determination means;

(e) said load determination means including at least one control chip and a portable power source to power said chip, said chip having sufficient capability to receive, store and send and display weight data from a load determination component and to said load determination display means, and (f) said main housing including user input means connected to said chip, and said chip being programmable to set a start weight storage data, to obtain new weight data periodically, and to compare said start weight storage data to said new weight storage data, and to display comparative information on said load determination display means.

12. The luggage device of claim 11 wherein said load determination means is a mechanical scale means.

13. The luggage device of claim 11 wherein said load determination means is a strain gauge means.

14. The luggage device of claim 11 wherein said load determination means is a load cell means.

15. The luggage device of claim 11 wherein said top of said handle has a plurality of connections to said load determination means, there are a plurality of said base members, and at least one base member of said load determination means is connected to each of said plurality of connections.

16. The luggage device of claim 15 wherein said handle two connections, each connection being connected to a base member.

17. The luggage device of claim 11 wherein said main housing includes user input means connected to said chip, and said chip is programmable to set a start weight storage data, to obtain new weight data when said user input means signals to do so, to compare said start weight storage data to new weight storage data, and to send and to display comparative information on said load determination display means.

18. The luggage device of claim 11 wherein said main housing includes user input means connected to said chip, and includes an alarm connected to said chip, and said chip is programmable to set a start weight storage data, to obtain new weight data periodically, and to compare said start weight storage data to said new weight storage data, and to set off said alarm if said comparison exceeds a predetermined amount of weight difference.

19. A luggage device having a built-in load determination capability comprising:

(a) a luggage holding bag having top, bottom and side sections;

(b) at least one load determination mechanism integrally connected to the bottom section of said luggage holding bag;

(c) at least one base plate connected said load determination mechanism and arranged such that the luggage device can be supported on a surface on said base plate, at which time the weight of the luggage device may be calculated by said load determination mechanism; and (d) a display means connected to said load determination mechanism for displaying calculated load results.

20. The luggage device of claim 19 wherein the bottom section and base plate are round, and wherein said load determination mechanism comprises a load cell, and processor means.

21. The luggage device of claim 19 wherein said at least one load determination mechanism and base plate are integrally connected by at least one support element attached to the bottom section of said luggage holding bag, and additionally comprising a processor means attached to said at least one load determination mechanism and display means.

22. The luggage device of claim 19 additionally comprising a processor means connected to said load determination mechanism and said display means having sufficient capability to calculate, receive, and store weight data, and send weight data from said load determination mechanism to the display means.

23. The luggage device of claim 22 additionally comprising user input means connected to said processor means and enabling a user to set start weight storage data, obtain new weight data, compare said start weight storage data to said new weight storage data, and displaying comparative information on said display means.

24. The luggage device of claim 23 additionally comprising an alarm connected to said processor means that will sound if said start weight storage data exceeds a predetermined amount of weight difference from said new weight storage data.

25. The luggage device of claim 22 wherein at least some of the connections between said load determination mechanism, processor means, and display means are wireless.

26. The luggage device of claim 22 additional comprising a means for downloading stored weight information to a separate storage medium.

* * * * *